United States Patent
Wurman et al.

(10) Patent No.: US 9,694,976 B1
(45) Date of Patent: Jul. 4, 2017

(54) RE-ARRANGE STORED INVENTORY HOLDERS

(71) Applicant: Amazon Technologies, Inc., Seattle, WA (US)

(72) Inventors: Peter R. Wurman, Acton, MA (US); Jeremiah David Brazeau, Hudson, NH (US); Pardeep Singh Farwaha, Medford, MA (US); Ryan Alexander Holt, North Andover, MA (US); Joseph W. Durham, Somerville, MA (US); John Joseph Enright, Somerville, MA (US); Alex Glazkov, Boston, MA (US); Jared Brian Holcomb, Haverhill, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/385,766

(22) Filed: Dec. 20, 2016

Related U.S. Application Data

(63) Continuation of application No. 15/099,531, filed on Apr. 14, 2016, which is a continuation of application No. 14/499,047, filed on Sep. 26, 2014, now Pat. No. 9,452,883.

(51) Int. Cl.
| | |
|---|---|
| G06F 7/00 | (2006.01) |
| B65G 1/137 | (2006.01) |
| B65G 1/04 | (2006.01) |
| B65G 1/10 | (2006.01) |
| G05D 1/02 | (2006.01) |
| G06Q 10/08 | (2012.01) |

(52) U.S. Cl.
CPC ........... *B65G 1/137* (2013.01); *B65G 1/0492* (2013.01); *B65G 1/10* (2013.01); *G05D 1/0287* (2013.01); *G06Q 10/087* (2013.01); *G05D 2201/0216* (2013.01)

(58) Field of Classification Search
USPC ....................................................... 700/218
See application file for complete search history.

(56) References Cited

U.S. PATENT DOCUMENTS

| | | |
|---|---|---|
| 8,280,547 B2 | 10/2012 | D'Andrea et al. |
| 9,087,314 B2 | 7/2015 | Hoffman et al. |
| 9,452,883 B1 | 9/2016 | Wurman et al. |

(Continued)

OTHER PUBLICATIONS

U.S. Appl. No. 14/499,047, "Non-Final Office Action", Jul. 10, 2015, 12 pages.

(Continued)

*Primary Examiner* — Kyle Logan
(74) *Attorney, Agent, or Firm* — Kilpatrick Townsend & Stockton

(57) ABSTRACT

Inventory holders in an inventory system can be moved among differing storage positions. The moves can be performed by mobile drive units not otherwise transporting inventory holders directly to or from inventory stations. A free mobile drive unit can move an inventory holder not likely to be useful soon at any nearby station from a storage position near the station to a position farther away from the station. A mobile drive unit can move an inventory holder likely to be useful soon from a storage position farther away from one or more stations to a storage position nearby one or more stations.

20 Claims, 7 Drawing Sheets

(56) References Cited

U.S. PATENT DOCUMENTS

| | | | |
|---|---|---|---|
| 2007/0017984 A1* | 1/2007 | Mountz | G08C 17/02 |
| | | | 235/385 |
| 2007/0021863 A1* | 1/2007 | Mountz | G06Q 10/087 |
| | | | 700/214 |
| 2009/0185884 A1* | 7/2009 | Wurman | B65G 1/1378 |
| | | | 414/270 |
| 2012/0143427 A1 | 6/2012 | Hoffman et al. | |
| 2013/0173049 A1* | 7/2013 | Brunner | G06Q 10/08 |
| | | | 700/216 |

OTHER PUBLICATIONS

U.S. Appl. No. 14/499,047 , "Notice of Allowance", Jun. 7, 2016, 10 pages.
U.S. Appl. No. 14/499,047 , "Notice of Allowance", Jan. 15, 2016, 9 pages.
U.S. Appl. No. 15/099,531, filed Apr. 14, 2016, Titled: Re-Arrange Stored Inventory Holders.
U.S. Appl. No. 15/099,531 , "Non-Final Office Action", Sep. 21, 2016, 10 pages.

* cited by examiner

US 9,694,976 B1

RE-ARRANGE STORED INVENTORY HOLDERS

CROSS REFERENCE TO RELATED APPLICATIONS

This application is a continuation of U.S. application Ser. No. 15/099,531, filed Apr. 14, 2016, and entitled "RE-ARRANGE STORED INVENTORY HOLDERS", which is a continuation of U.S. application Ser. No. 14/499,047, filed Sep. 26, 2014, issued as U.S. Pat. No. 9,452,883 on Sep. 27, 2016, and entitled "RE-ARRANGE STORED INVENTORY HOLDERS", the contents of which are herein incorporated by reference in their entireties.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which like reference numerals may represent like parts, and in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to re-arranging inventory holders within a storage area utilizing mobile drive units that are not otherwise immediately engaged in moving other inventory holders to or from a particular station.

In accordance with an embodiment, mobile drive units that might otherwise sit idle while awaiting another task assignment are tasked with moving inventory holders into more useful storage positions. Inventory holders may be arranged to facilitate near-future station activities such as pick, stow, or count operations.

Figure 1:
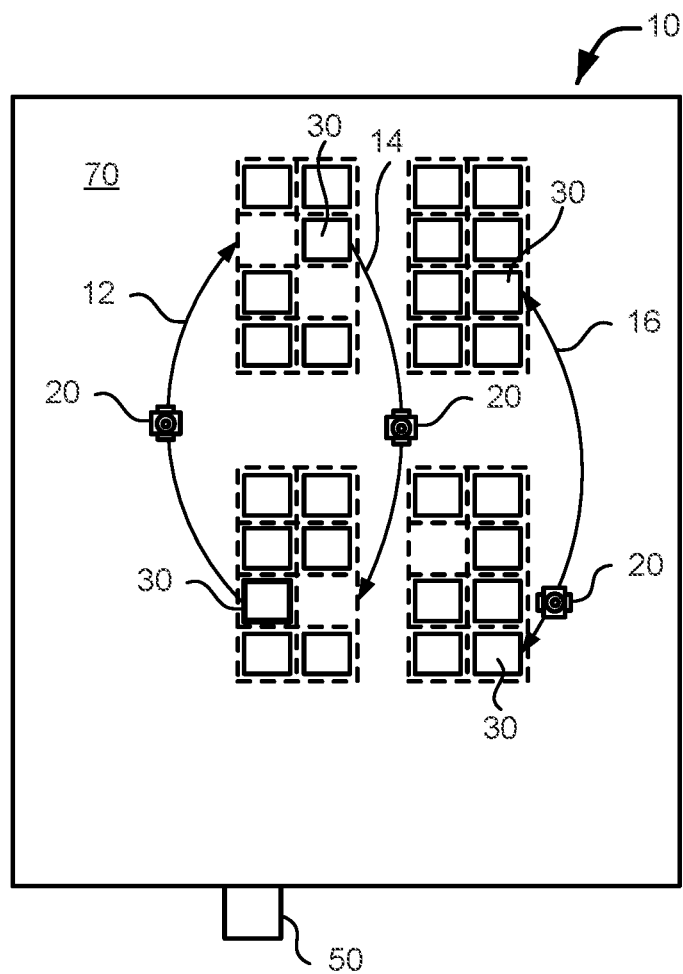
FIG. 1 illustrates examples of movement of inventory holders among storage positions within an inventory system according to a particular embodiment.

For example, FIG. 1 depicts an inventory system 10 in which mobile drive units 20 can be tasked with moving inventory holders 30 among differing storage positions. The moves can be performed when the mobile drive units 20 are not otherwise transporting inventory holders 30 directly to or from a station 50, such as when the mobile drive unit 20 is en route to pick up an inventory holder 30 for a station 50 or when the mobile drive unit 20 is not occupied with another task. Using such unencumbered mobile drive units 20 to move inventory holders 30 among differing storage positions may improve efficiency of future tasks involving transport of inventory holders 30 between storage and stations 50.

In a first example, a free mobile drive unit 20 may move an inventory holder 30 that is not used frequently (i.e., an inventory holder with a low utility) at a station 50 from a storage position near the station 50 to a position farther away from the station 50 (such as depicted by a first arrow 12). This action may free up space for storage of an inventory holder 30 that is used more frequently at the station 50 (i.e., an inventory holder with a higher utility). In a second example, a mobile drive unit 20 may move an inventory holder 30 with a high utility from a position farther away from the station 50 to a storage position near the station 50 (such as depicted by a second arrow 14). This action may make the inventory holder 30 more readily available for a future task at the station 50. In a third example, a single mobile drive unit 20 may move both an inventory holder 30 with a high utility and an inventory holder 30 with a low utility in order to swap the positions of the inventory holders 30 relative to the station (such as depicted by the double-sided arrow 16). This action may help optimize the arrangement of inventory holders 30 relative to the station 50.

Figure 2:
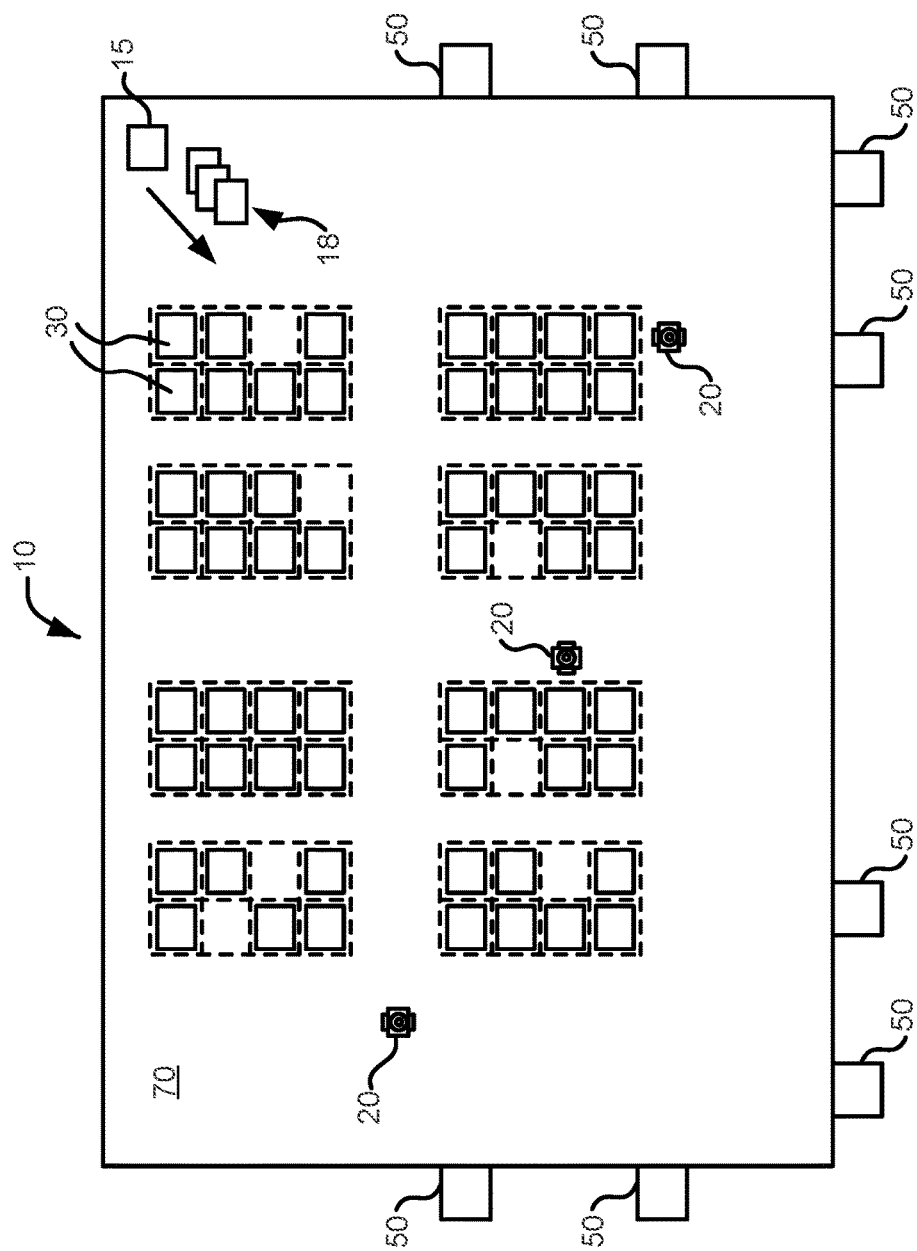
FIG. 2 illustrates components of an inventory system according to a particular embodiment.

FIG. 2 illustrates the contents of an inventory system 10. Inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interaction between a particular mobile drive unit 20 and management module 15 that is described below may, in particular embodiments, represent peer-to-peer communication between that mobile drive unit 20 and one or more other mobile drive units 20. The contents and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The contents and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by human operators or may be fully automated. Moreover, the human or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. In some embodiments, workspace 70 includes multiple floors, and some combination of ramps, elevators, conveyors, and/or other devices are provided to facilitate movement of mobile drive units 20 and/or other components of the inventory system 10 between the multiple floors. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
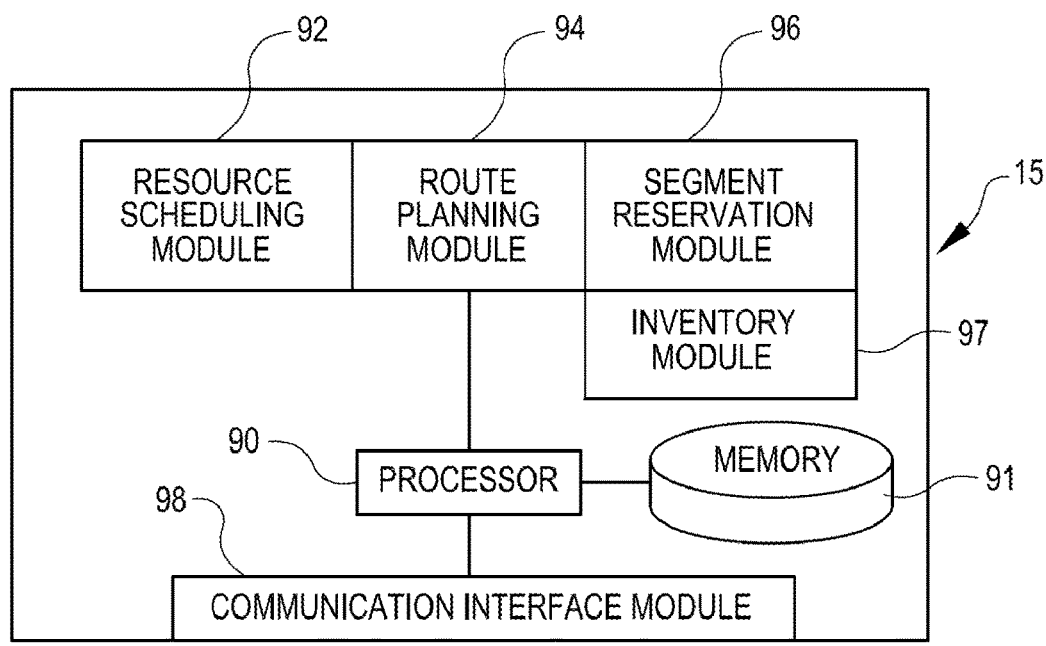
FIG. 3 illustrates in greater detail the components of an example management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data. Examples of memory 91 include, but are not limited to, random access memory (RAM) devices, read only memory (ROM) devices, magnetic storage devices, optical storage devices, or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish, or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
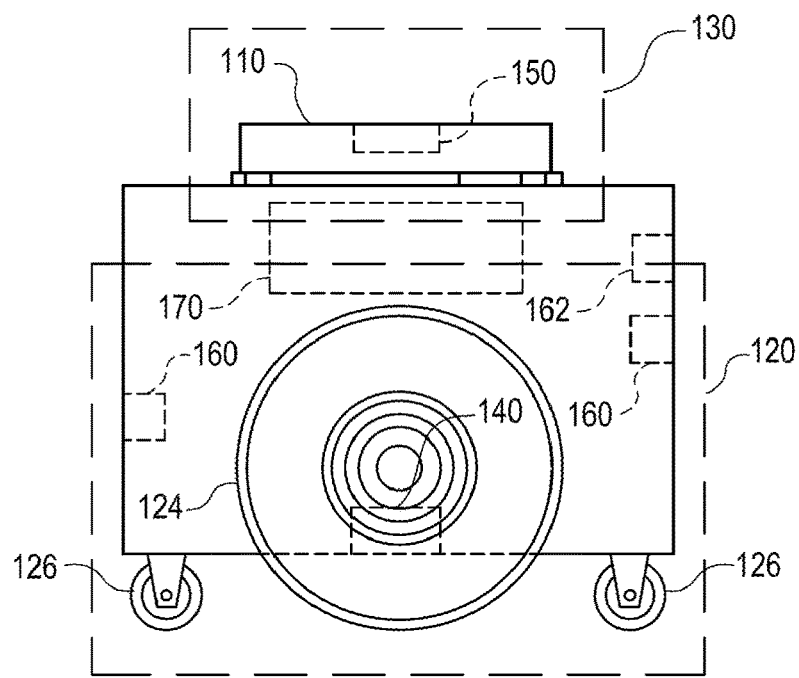
FIGS. 4 and 5 illustrate in greater detail an example mobile drive unit that may be utilized in particular embodiments of the inventory system shown in FIG. 2.
Figure 5:
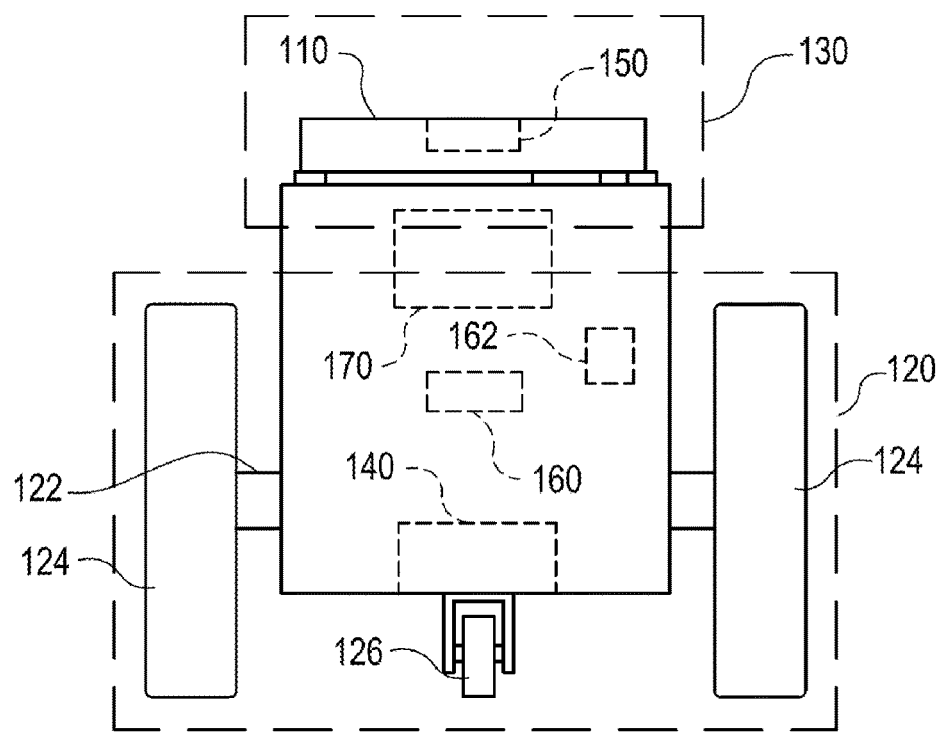

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent") operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering, and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
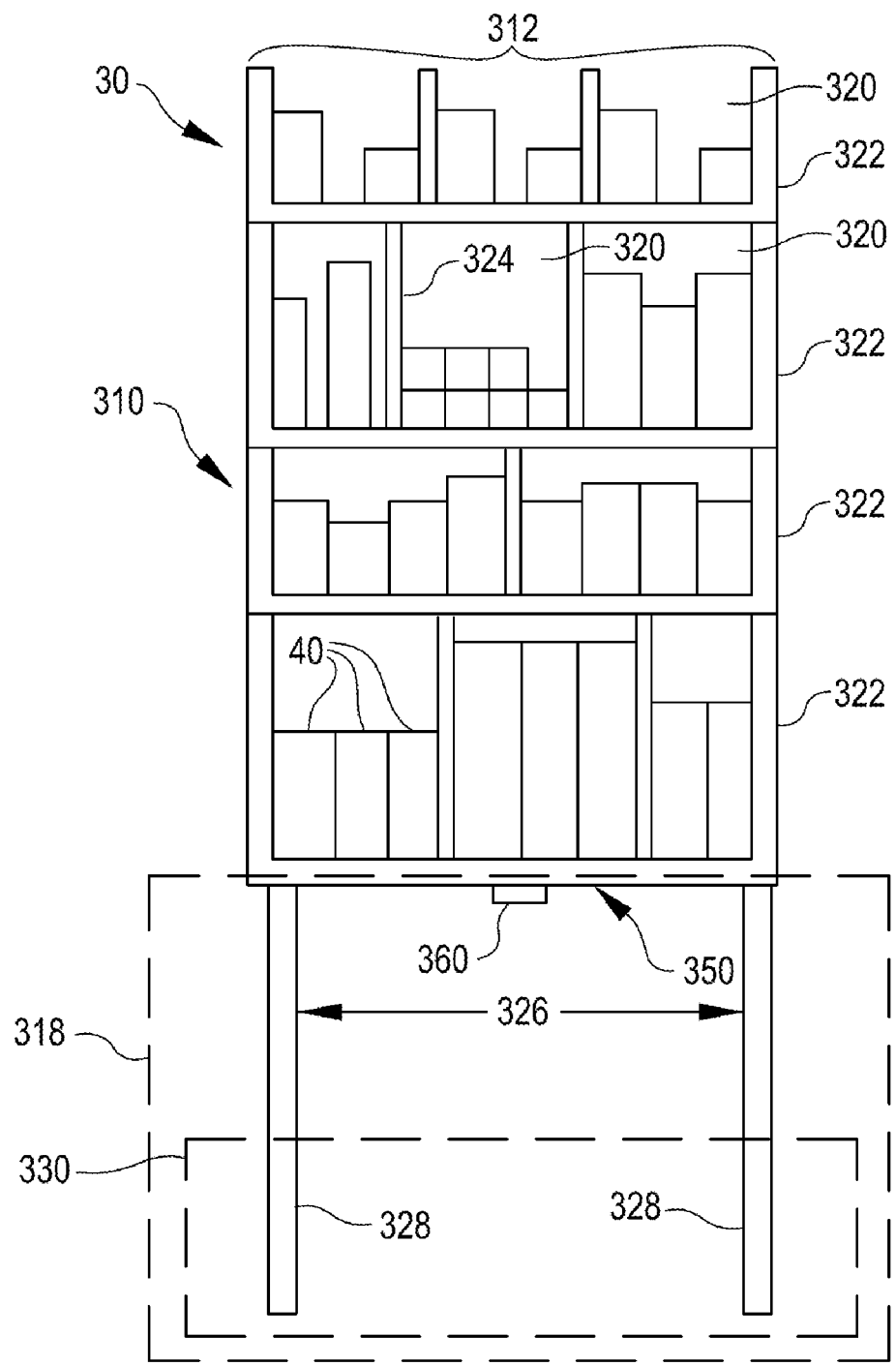
FIG. 6 illustrates in greater detail an example inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. In some embodiments, a frame 310 and/or an inventory bin 320 of an inventory holder 30 may be designed to accommodate one or more pallets for inventory items 40. Additionally, in particular embodiments, frame 310 may represent a load-bearing surface mounted on mobility element 330. Inventory items 40 may be stored on such an inventory holder 30 by being placed on frame 310. In general, frame 310 may include storage internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to re-arranging inventory holders 30 within a storage area utilizing mobile drive units 20 that are not otherwise immediately engaged in moving other inventory holders 30 to or from a particular station 50. The storage area may include storage locations or spaces for storing inventory holders 30 when the inventory holders 30 are not at a station 50, not en route to a station 50, not en route from a station 50, or otherwise not affiliated with a station 50.

Figure 7:
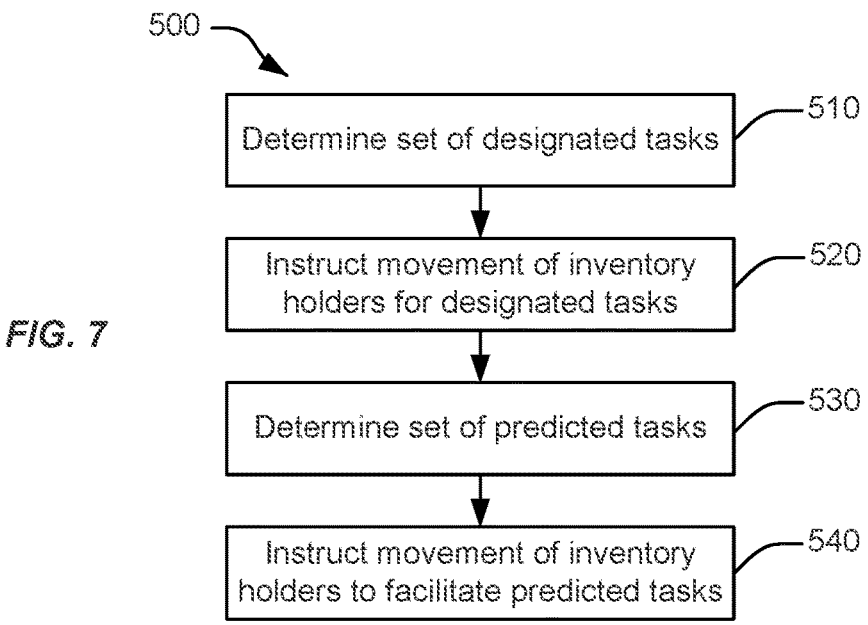
FIG. 7 is a flowchart illustrating an example of a process for re-arranging inventory holders based at least in part on predictions about the allocation of tasks to stations according to a particular embodiment.

In some embodiments, inventory holders 30 may be re-arranged based at least in part on predictions about the allocation of tasks to stations 50. FIG. 7 is a flowchart illustrating an example of a process 500 for such a prediction-based re-arranging of inventory holders 30. At 510, the management module 15 can access (e.g., retrieve, receive, and/or generate, as non-limiting examples) a set of designated tasks. This set can include tasks that are designated for performance in association with a particular station 50.

At 520, the management module 15 can instruct movement of inventory holders 30 for the designated tasks. For example, the management module 15 can instruct mobile drive units 20 to move inventory holders 30 that satisfy criteria of tasks designated for a station 50. The management module 15 can instruct mobile drive units 20 to move inventory holders 30 to, at, or from stations 50 designated for tasks involving the inventory holders 30.

At 530, management module 15 can determine a set of predicted tasks. This set can include tasks that are predicted to be—but not yet designated to be—performed in association with a particular station 50, i.e., predicted movements of inventory holders 30 to, at, and/or from a particular station 50. For example, the management module 15 may allocate tasks to components within the inventory system 10 that are determined to have sufficient capacity to receive task assignments 18 and, based on the parameters of the allocated tasks, predict which components are likely to soonest have capacity anew and thus receive subsequent task assignments 18 to move inventory holders 30 to, at, and/or from particular stations 50.

At 540, the management module 15 can instruct movement of inventory holders 30 to facilitate the predicted tasks. For example, the management module 15 can instruct mobile drive units 20 to move inventory holders 30 closer to stations 50 predicted to soon utilize those inventory holders 30 and/or further from stations 50 predicted not to use those inventory holders 30 within an anticipated timeframe.

As an illustrative example, the process 500 is utilized with respect to a station 50 configured for stowing operations, e.g., operations in which inventory items 40 are introduced into the inventory system 10 by loading into open inventory bins 320 of inventory holders 30. For example, inventory items 40 may be transferred to pallets, containers, trays, or any other suitable receptacle of an inventory holder 30 at the stow station 50. At 510, the management module 15 can determine a set of designated tasks that involve identifying and moving, for example, the three closest inventory holders 30 having open inventory bins 320 to three available station locations (e.g., spaces at the station 50 configured to receive inventory holders 30 for performance of related tasks). At 520, the management module can identify and instruct three nearby available mobile drive units 20 to move the identified three closest open inventory holders 30. At 530, in determining a set of predicted tasks for the stow station 50, the management module 15 determines that future tasks associated with the stow station 50 will involve obtaining additional open inventory holders 30 from various positions within the inventory system 10. At 540, the management module 15 instructs additional mobile drive units 20 to move additional open inventory holders 30 to storage positions closer to the stow station 50 to facilitate the predicted future tasks of obtaining open inventory holders 30 near the stow station 50.

As another illustrative example, the process 500 is utilized with respect to a station 50 configured for counting operations, e.g., operations in which an operator counts to verify or determine a number of inventory items 40 in a questioned inventory bin 320. For example, inventory items 40 may be counted relative to any particular pallet, container, tray, or any other suitable receptacle of an inventory holder 30 at the count station 50. At 510, the management module 15 can determine a set of designated tasks that involve identifying and moving, for example, the three closest inventory holders 30 having questioned inventory bins 320 to three available spaces at the count station 50. At 520, the management module can identify and instruct three nearby available mobile drive units 20 to move the identified three closest questioned inventory holders 30. At 530, in determining a set of predicted tasks for the count station 50, the management module 15 determines that future tasks associated with the count station 50 will involve obtaining additional questioned inventory holders 30 from various positions within the inventory system 10. At 540, the management module 15 instructs additional mobile drive units 20 to move additional questioned inventory holders 30 to storage positions closer to the count station 50 to facilitate the predicted future tasks of obtaining questioned inventory holders 30 near the count station 50.

As a further illustrative example, the process 500 is utilized with respect to a station 50 configured for picking operations, e.g., operations in which ordered inventory items 40 are obtained from the inventory system 10 by removal from inventory holders 30 containing the ordered inventory item 40. For example, inventory items 40 may be transferred from pallets, containers, trays, or any other suitable receptacle of an inventory holder 30 at the pick station 50. At 510, the management module 15 can determine a set of designated tasks that involve identifying and moving, for example, the three closest inventory holders 30 having ordered inventory items 40 to three available spaces at the pick station 50. At 520, the management module can identify and instruct three nearby available mobile drive units 20 to move the three identified inventory holders 30 to the pick station 50. At 530, in determining a set of predicted tasks for the pick station 50, the management module 15 determines that future tasks associated with the pick station 50 will involve obtaining inventory holders 30 with particular inventory items 40 from various positions within the inventory system 10 for orders predicted for the pick station 50. At 540, the management module 15 instructs additional mobile drive units 20 to move inventory holders 30 with the particular inventory items 40 for the predicted orders to storage positions closer to the pick station 50 to facilitate the predicted future tasks of obtaining such inventory holders 30 near the pick station 50.

Figure 8:
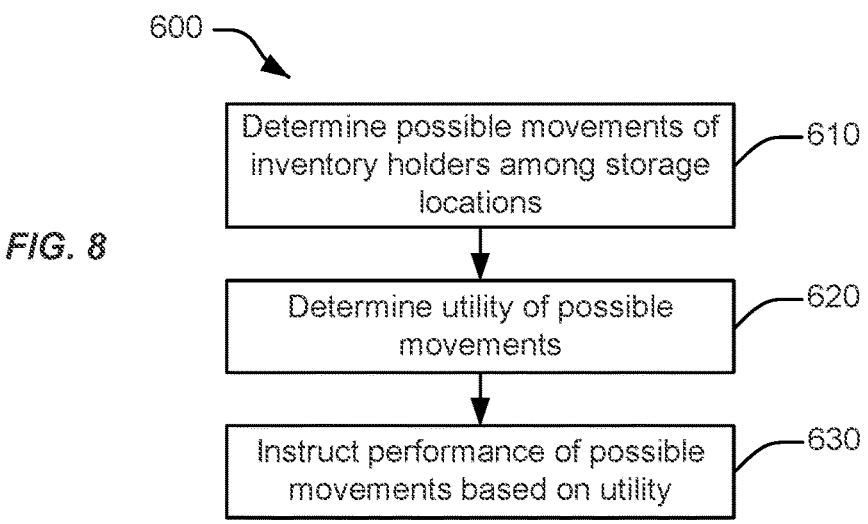
FIG. 8 is a flowchart illustrating an example of a process for moving inventory holders among storage locations based at least in part on utility of such movements according to a particular embodiment.

In some embodiments, inventory holders 30 may be moved among storage positions based at least in part on a utility of such movements. FIG. 8 is a flowchart illustrating an example of a process 600 for such a utility-based movement of inventory holders 30.

At 610, the management module can determine possible movements of inventory holders 30 among storage locations. For example, for a particular inventory holder 30, the management module 15 may determine alternate storage spaces that are available and mobile drive units 20 that are available to move the inventory holder 30 to each alternate storage space. In some embodiments, the management module 15 evaluates possible movements for all inventory holders 30 of the inventory system 10. In other embodiments, the management module 15 evaluates possible movements for a subset of all inventory holders 30. For example, the management module 15 may evaluate possible movements for a subset of inventory holders 30 that meet criteria associated with tasks associated with a particular station 50, such as movements that will move the most useful inventory holders 30 closer to the particular station. As another example, the management module 15 may evaluate possible movements for a subset of inventory holders 30 that fail criteria associated with tasks associated with a particular station 50, such as movements that will take these less useful inventory holders 30 farther away from the particular station 50. Such movements may increase an amount of storage space near the station 50 for inventory holders 30 that are more useful to that station 50.

At 620, the management module 15 can determine a utility of the possible movements. The utility represents the usefulness of a set of movements offset by the cost of those movements. For example, the management module 15 may assign a utility score to each of the set of possible movements. The utility score can incorporate a number of factors, such as a drive time involved in a particular movement for a mobile drive unit 20, an amount (e.g., of time or distance) a mobile drive unit 20 would deviate from other tasks to perform the particular movement, a change in distance of an inventory holder 30 relative to a particular station 50 provided by a particular movement, a degree to which contents of the inventory holder 30 match criteria or demands of a particular station 50, a timeframe of the demands of a particular station 50, and/or scores representing future gains and/or losses in total system efficiency. As illustrative examples, utility scores may be higher for movements that involve a shorter drive time for an available mobile drive unit 20, a smaller amount of deviation from other tasks for a mobile drive unit 20, a decrease in distance to a station 50 of an inventory holder 30 likely to soon be useful at that station 50, an increase in distance to a station 50 of an inventory holder 30 unlikely to soon be useful at that station 50, an inventory holder 30 with many contents that match criteria or demands of a particular station 50, facilitating high urgency demands of a particular station 50, anticipated increased gains in total system efficiency, and/or anticipated reduced losses in total system efficiency.

At 630, the management module 15 can instruct the performance of possible movement based on the utility of the movements. For example, the management module 15 may compare utility scores to a threshold and instruct mobile drive units 20 to perform the movements having scores exceeding the threshold. In another example, the management module 15 may compare utility scores of various movements and instruct mobile drive units 20 to perform the movements with the highest relative utility scores.

As a simplified illustrative example of the process 600, at 610, the management module determines that possible movements include using an available mobile drive unit 20 for moving a first inventory holder 30 or a second inventory holder 30 to an open storage location. At 620, the management module 15 determines a utility score of 0.75 for moving the first inventory holder 30 (e.g., based on a drive time of 20 seconds and the inventory holder 30 including three out of five items anticipated to be needed at a station 10 seconds from the open storage location) and a utility score of 0.80 for moving the second inventory holder 30 (e.g., based on a drive time of 25 seconds and the inventory holder 30 including four out of five items anticipated to be needed at another station 5 seconds from the open storage location). At 630, the management module 15 determines that both movements are greater than a set minimum utility score threshold of 0.50, and instructs the movement of the second inventory holder 30, based on the utility score of 0.8 for that movement being greater than the 0.75 utility score associated with moving the first inventory holder 30.

Figure 9:
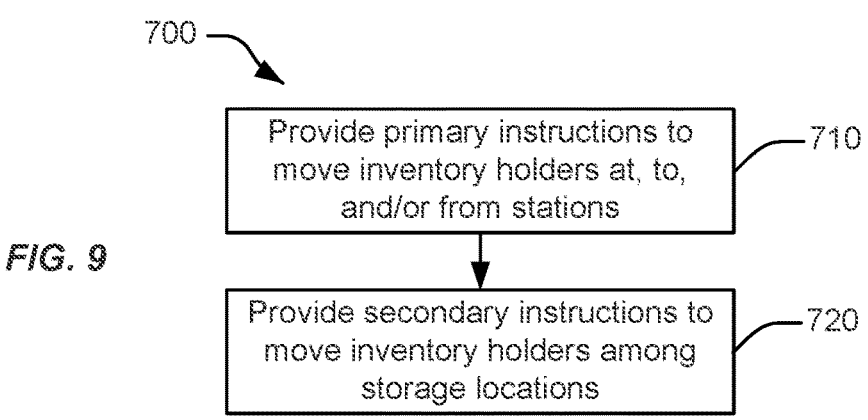
FIG. 9 is a flowchart illustrating an example of a process for shifting storage positions of inventory holders as secondary tasks according to a particular embodiment.

In some embodiments, shifting storage positions of inventory holders 30 may be secondary to other tasks. FIG. 9 is a flowchart illustrating an example of a process 700 for shifting storage positions of inventory holders 30 as secondary tasks.

At 710, the management module 15 can provide primary instructions to move inventory holders 30 to, at, and/or from stations 50. For example, the management module 15 may provide instructions to a first set of mobile drive units 20 to carry out these primary tasks.

At 720, the management module 15 can provide secondary instructions to move inventory holders 30 among storage locations. For example, the management module 15 may provide instructions to a second set of mobile drive units 20 to carry out these secondary tasks of altering the storage locations of inventory holders 30. In some embodiments, the management module 15 assigns the storage-shifting tasks to mobile drive units 20 that are not occupied with primary tasks of moving inventory holders 30 for stations 50. Alternatively or additionally, the secondary storage-shifting tasks can be assigned to the first set of mobile drive units 20 en route to pick up—but not yet carrying—inventory holders 30 for primary tasks. The secondary tasks may facilitate the primary tasks, such as by bringing inventory holders 30 closer to a station 50 for pick-up during a primary task or clearing space nearer the station 50 to reduce an amount of time to a drop-off location when transporting an inventory holder 30 away from a station 50 during a primary task.

The management module 15 may operate a first set of mobile drive units 20 for primary tasks and a second set of mobile drive units 20 for secondary tasks. In some embodiments, the first set and the second set are distinct sets without overlap. Such an arrangement may ensure that at least some mobile drive units 20 are always available for secondary tasks. In other embodiments, mobile drive units 20 may operate in either of the first set and the second set, such that all mobile drive units 20 can perform either primary or secondary tasks. For example, the second set may include whatever mobile drive units 20 are not occupied with primary tasks in a particular time interval. The mobile drive units 20 in the second set may be configured to receive primary tasks as the primary tasks come available and/or abort or abandon secondary tasks when inconsistent with received primary tasks. Such an arrangement may ensure that all mobile drive units 20 are always available for primary tasks. In some embodiments, all mobile drive units 20 may be assigned secondary tasks at once. For example, before an operator shift starts (e.g., when there may be no primary tasks due to the stations 50 not yet being operational), all mobile drive units 20 may be assigned to rearranging inventory holders 30 to facilitate operations expected to be performed at particular stations 50 upon commencement of the shift.

Any number of mobile drive units 20 may be utilized to shift the storage positions of any number of inventory holders 30. For example, as described above with respect to FIG. 1, a two-way swap of the storage positions of a high utility inventory holder 30 and a low utility inventory holder 30 may be performed by a single mobile drive unit 20 respectively moving both inventory holders 30 (such as depicted by arrow 16). However, a second mobile drive unit 20 could alternatively move one of the inventory holders 30 while the first mobile drive unit 20 moved the other inventory holder 30 to effect the same two-way swap. In some embodiments, more than two inventory holders 30 can be involved in a single swap. For example, three mobile drive units 20 could each move a respective inventory holder 30 from a respective near, intermediate, and far storage position, relative to a station 50, in a three-way swap in order to re-locate each respective inventory holder 30 into one of the storage spaces vacated by the other inventory holders 30. As may be appreciated, two-way, three-way, and up to n-way swaps (in which "n" corresponds to any number) may be performed.

Figure 10:
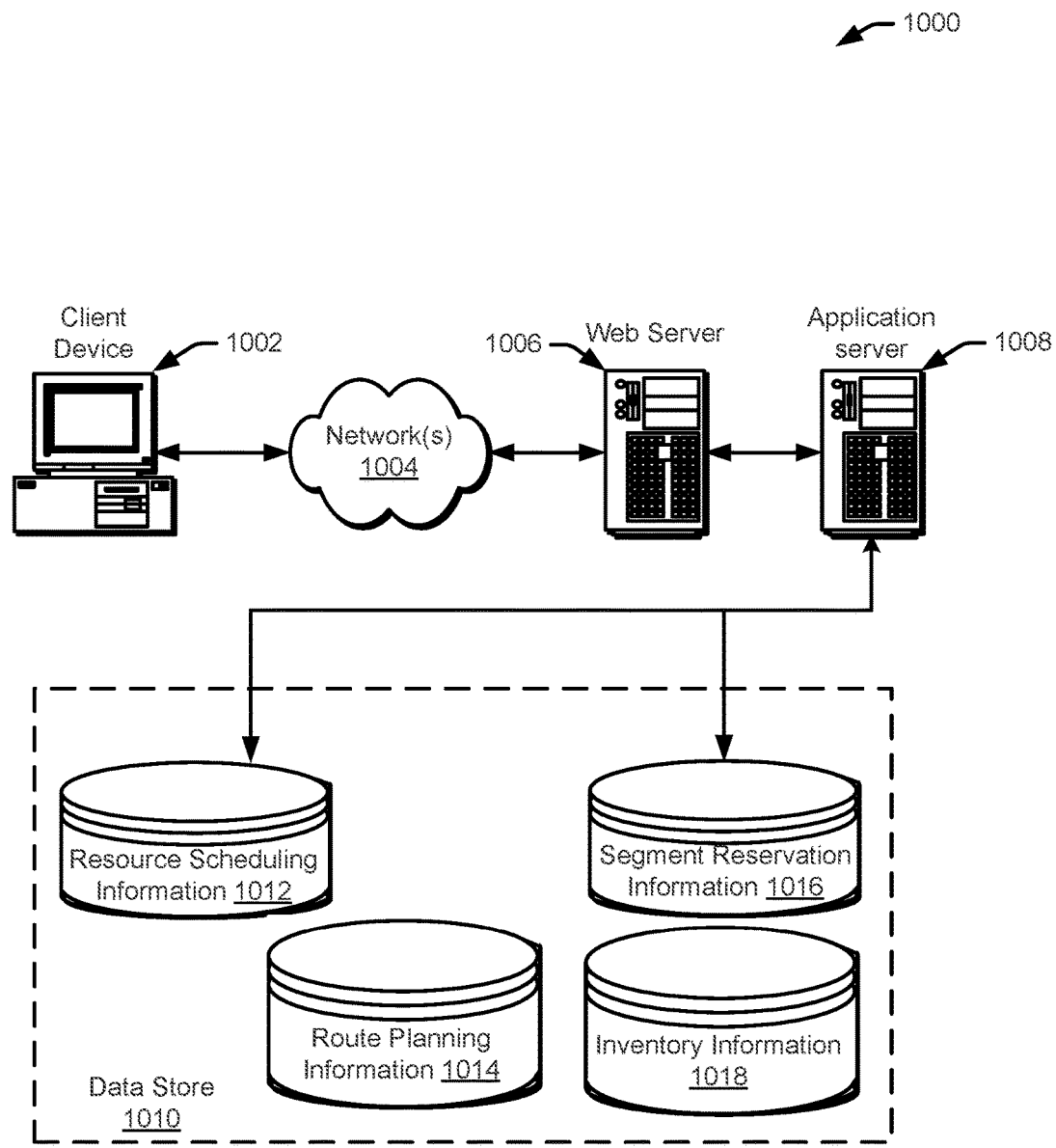
FIG. 10 illustrates an environment in which various features of the inventory system can be implemented, in accordance with at least one embodiment.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing information which can be used by modules described herein, such as resource scheduling information 1012, route planning information 1014, segment reservation information 1016, and/or inventory information 1018. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory system, comprising:
   mobile drive units configured to move inventory holders that are configured to store inventory items; and
   a management module configured to:
   access a designated set of tasks comprising tasks designated for performance at a station that is configured for performance of a task related to one or more inventory items associated with an inventory holder when the inventory holder is positioned at the station;
   instruct a first set of the mobile drive units to move respective inventory holders of a first set of inventory holders from respective storage locations to the station, the respective inventory holders of the first set of inventory holders meeting criteria of respective tasks of the designated set of tasks, each storage location for storing an inventory holder apart from the station when the inventory holder is not at the station;
   determine a predicted set of tasks comprising tasks predicted to be designated for performance at the station; and
   instruct a second set of the mobile drive units to move respective inventory holders of a second set of inventory holders from respective initial storage locations to respective subsequent storage locations further from the station, the respective inventory holders of the second set of inventory holders not meeting criteria of respective tasks of the predicted set of tasks.

2. The inventory system of claim 1, wherein the station is a stow station for loading inventory items into the inventory holders;
   wherein the predicted set of tasks determined by the management module comprises stowing tasks of loading inventory items into the inventory holders; and
   wherein the management module is further configured to instruct the second set of the mobile drive units to move respective inventory holders lacking available space for the stowing tasks from respective initial storage locations to respective subsequent storage locations further from the stow station.

3. The inventory system of claim 2, wherein the management module is configured to instruct a third set of the mobile drive units to move respective inventory holders having available space for the stowing tasks from respective initial storage locations to respective subsequent storage locations closer to the stow station.

4. The inventory system of claim 1, wherein the station is a count station for counting inventory items of the inventory holders;
   wherein the predicted set of tasks determined by the management module comprises counting tasks of counting inventory items of the inventory holders; and
   wherein the management module is further configured to instruct the second set of the mobile drive units to move respective inventory holders lacking inventory bins with inventory items therein to be counted for the counting tasks from respective initial storage locations to respective subsequent storage locations further from the count station.

5. The inventory system of claim 4, wherein the management module is configured to instruct a third set of the mobile drive units to move respective inventory holders having inventory bins with inventory items therein to be counted for the counting tasks from respective initial storage locations to respective subsequent storage locations closer to the count station.

6. The inventory system of claim 1, wherein the station is a pick station for unloading inventory items from the inventory holders;
   wherein the predicted set of tasks determined by the management module comprises picking tasks of unloading inventory items from the inventory holders; and
   wherein the management module is further configured to instruct the second set of the mobile drive units to move respective inventory holders lacking inventory items for the picking tasks from respective initial storage locations to respective subsequent storage locations further from the pick station.

7. The inventory system of claim 6, wherein the management module is configured to instruct a third set of the mobile drive units to move respective inventory holders having inventory items for the picking tasks from respective initial storage locations to respective subsequent storage locations closer to the pick station.

8. An inventory system comprising:
   a plurality of mobile drive units configured to move a plurality of inventory holders configured to store inventory items, the plurality of mobile drive units configured to move the plurality of inventory holders among locations including a plurality of stations and a plurality of storage locations, each station of the plurality of stations including at least one station location configured to receive an inventory holder for completion of a task involving at least one inventory item associated with the inventory holder, each storage location of the plurality of storage locations configured to store an inventory holder when the inventory holder is not at a station location; and
   a management module configured to:
   determine possible movements of the plurality of inventory holders among the plurality of storage locations;
   determine a utility of an arrangement of inventory holders in the plurality of storage locations resulting from each of the possible movements, wherein the utility is based at least in part on a utility score assigned to each of the possible movements, wherein the utility score of each possible movement is based on at least one of:
   a drive time involved in the possible movement for a mobile drive unit;
   an amount of time a mobile drive unit would deviate from other tasks to perform the possible movement;
   an amount of distance a mobile drive unit would deviate from other tasks to perform the possible movement;
   a change in distance of an inventory holder relative to a particular station provided by the possible movement;
   a degree to which contents of an inventory holder moved by the possible movement match criteria or demands of a particular station;

a timeframe of the demands of a particular station;
future gains in total system efficiency provided by the possible movement; or
future losses in total system efficiency provided by the possible movement; and
instruct at least one of the plurality of mobile drive units to perform at least one of the possible movements based on the determined utility.

9. The inventory system of claim 8, wherein the management module configured to instruct at least one of the plurality of mobile drive units to perform at least one of the possible movements based on the determined utility comprises the management module configured to instruct the at least one of the plurality of mobile drive units to perform the at least one of the possible movements having a utility score exceeding a threshold.

10. The inventory system of claim 8, wherein the management module configured to instruct at least one of the plurality of mobile drive units to perform at least one of the possible movements based on the determined utility comprises the management module configured to instruct the at least one of the plurality of mobile drive units to perform the at least one of the possible movements having a highest utility score relative to other possible movements.

11. The inventory system of claim 8, wherein the management module configured to determine possible movements of the plurality of inventory holders among the plurality of storage locations comprises the management module configured to determine possible movements of the plurality of inventory holders that meet criteria associated with tasks that are predicted to be associated with a particular station.

12. An inventory system comprising:
a plurality of mobile drive units configured to move a plurality of inventory holders configured to store inventory items, the plurality of mobile drive units configured to move the plurality of inventory holders among locations including a plurality of stations and a plurality of storage locations, each station of the plurality of stations comprising at least one station location configured to receive an inventory holder for completion of a task involving at least one inventory item associated with the inventory holder, each storage location of the plurality of storage locations configured to receive an inventory holder for storage of the inventory holder when the inventory holder is not at a station location; and
a management module configured to:
provide primary instructions to each of a first set of mobile drive units to at least one of move an inventory holder at a station location, move an inventory holder to a station location, or move an inventory holder from a station location; and
provide secondary instructions, to be performed when not performing one of the primary instructions, to at least one mobile drive unit of a second set of mobile drive units to swap storage locations of at least two inventory holders.

13. The inventory system of claim 12, wherein the first set of mobile drive units includes at least one of the mobile drive units of the second set of mobile drive units.

14. The inventory system of claim 12, wherein the management module is further configured to provide primary instructions only to the first set of mobile drive units and provide secondary instructions only to the second set of mobile drive units, wherein the first set of mobile drive units and the second set of mobile drive units are distinct from one another.

15. The inventory system of claim 12, wherein the management module configured to provide secondary instructions to at least one mobile drive unit of the second set of mobile drive units comprises at least providing secondary instructions to a mobile drive unit to swap storage locations of the at least two inventory holders.

16. The inventory system of claim 12, wherein the management module configured to provide secondary instructions to at least one mobile drive unit of the second set of mobile drive units comprises at least providing secondary instructions to at least two mobile drive units to swap storage locations of the at least two inventory holders.

17. The inventory system of claim 12, wherein the management module is further configured to provide the secondary instructions so as to facilitate moves predicted to be instructed by the primary instructions.

18. An inventory system comprising:
a plurality of mobile drive units configured to move a plurality of inventory holders configured to store inventory items, the plurality of mobile drive units configured to move the plurality of inventory holders among locations including a plurality of stations and a plurality of storage locations, each station of the plurality of stations comprising at least one station location configured to receive an inventory holder for completion of a task involving at least one inventory item associated with the inventory holder, each storage location of the plurality of storage locations configured to receive an inventory holder for storage of the inventory holder when the inventory holder is not at a station location; and
a management module configured to:
provide primary instructions to each of a first set of mobile drive units to at least one of move an inventory holder at a station location, move an inventory holder to a station location, or move an inventory holder from a station location; and
provide secondary instructions, to be performed when not performing one of the primary instructions, to each of a second set of mobile drive units to move an inventory holder from one storage location to another storage location so as to facilitate moves predicted to be instructed by the primary instructions based on a determined utility of the secondary instructions for facilitating the moves predicted to be instructed by the primary instructions.

19. The inventory system of claim 18, wherein the management module configured to provide secondary instructions comprises the management module configured to provide secondary instructions based on the determined utility having a utility score exceeding a threshold.

20. The inventory system of claim 18, wherein the management module configured to provide secondary instructions comprises the management module configured to provide secondary instructions based on the determined utility having a highest utility score relative to other possible movements.

* * * * *